(12) United States Patent
Zhang (10) Patent No.: US 10,732,313 B2
(45) Date of Patent: Aug. 4, 2020

(54) SYSTEM AND METHOD FOR LOCATING UNDERGROUND LINES USING MOTION BASED RESPONSIVENESS

(71) Applicant: METROTECH CORPORATION, Santa Clara, CA (US)

(72) Inventor: Chunning Zhang, San Jose, CA (US)

(73) Assignee: METROTECH CORPORATION, Santa Clara, CA (US)

( * ) Notice: Subject to any disclaimer, the term of this patent is extended or adjusted under 35 U.S.C. 154(b) by 236 days.

(21) Appl. No.: 15/191,362

(22) Filed: Jun. 23, 2016

(65) Prior Publication Data

US 2016/0377760 A1 Dec. 29, 2016

Related U.S. Application Data

(60) Provisional application No. 62/185,463, filed on Jun. 26, 2015.

(51) Int. Cl.
*G01V 3/165* (2006.01)
*G01B 7/26* (2006.01)
*G01V 3/08* (2006.01)

(52) U.S. Cl.
CPC ............ *G01V 3/165* (2013.01); *G01B 7/26* (2013.01); *G01V 3/081* (2013.01)

(58) Field of Classification Search
None
See application file for complete search history.

(56) References Cited

U.S. PATENT DOCUMENTS

| | | | |
|---|---|---|---|
| 3,889,108 A * | 6/1975 | Cantrell | H03H 21/0043 327/553 |
| 6,407,550 B1 | 6/2002 | Parakulam et al. | |
| 7,741,848 B1 * | 6/2010 | Olsson | G01V 3/15 324/326 |
| 2005/0096883 A1 * | 5/2005 | Pacey | G01V 3/08 702/193 |

(Continued)

OTHER PUBLICATIONS

International Search Report for PCT Application No. PCT/US2016/039442 issued by the US Searching Authority dated Sep. 8, 2016; pp. 1-2.

(Continued)

*Primary Examiner* — Nasima Monsur
(74) *Attorney, Agent, or Firm* — Haynes and Boone, LLP (57) ABSTRACT

A system and method of for underground line location using motion based responsiveness includes an underground line locator. The underground line locator includes a receiver generating raw measurement data based on a location of an underground line relative to the receiver, a motion sensor generating motion data based on a state of motion of the underground line locator, a processor coupled to the receiver and the motion sensor, and a display coupled to the processor. The processor determines a measurement signal based on the raw measurement data. A responsiveness of the measurement signal to the raw measurement data is based on the motion data. The display shows a representation of the measurement signal. In one or more embodiments, the measurement signal may be determined using a primary signal detector that adaptively filters the raw measurement data using an adaptive band-pass filter.

13 Claims, 7 Drawing Sheets

(56) References Cited

U.S. PATENT DOCUMENTS

| | | | | |
|---|---|---|---|---|
| 2006/0055584 A1* | 3/2006 | Waite | ................... | G01S 13/86 |
| | | | | 342/22 |
| 2006/0232259 A1* | 10/2006 | Olsson | ............... | G01R 29/0871 |
| | | | | 324/67 |
| 2007/0263842 A1* | 11/2007 | Pessoa | .................... | H04Q 1/44 |
| | | | | 379/283 |
| 2010/0082845 A1* | 4/2010 | Kim | ........................ | G06F 3/147 |
| | | | | 710/14 |
| 2011/0191058 A1* | 8/2011 | Nielsen | ............... | B65D 83/203 |
| | | | | 702/130 |

OTHER PUBLICATIONS

Written Opinion of the International Searching Authority for PCT Application No. PCT/US2016/039442 issued by the US Searching Authority dated Sep. 8, 2016; pp. 1-6.
Extended European Search Report from European Patent Application No. 16815465.6, dated May 20, 2019.

* cited by examiner

SYSTEM AND METHOD FOR LOCATING UNDERGROUND LINES USING MOTION BASED RESPONSIVENESS

RELATED APPLICATION

The present application claims the priority to U.S. Provisional Patent Application No. 62/185,463 filed Jun. 26, 2015, the entire contents of each being incorporated herein by reference.

TECHNICAL FIELD

The present disclosure relates generally to underground line location and more particularly to underground line location using motion based responsiveness.

BACKGROUND

An underground line locator, such as utility line locator, is a portable, manually moveable instrument used to detect signals generated by underground lines, such as utility pipes, cables, and/or the like. The signals generated by the underground lines may include, for example, alternating magnetic fields produced by alternating currents transmitted through buried conductive lines. Based on the detected signals, underground line locators are used to determine the location of underground lines that would otherwise be difficult to locate. The ability to accurately locate underground lines is highly desirable in many applications. For example, inadvertently digging into an electrical and/or gas line may result in injury, fires, toxic emissions, damage to the digging equipment, damage to the utility line, and/or the like. Furthermore, the ability to accurately locate underground lines provides greater knowledge about the layout of a site. For example, detailed knowledge about the location of underground lines at a given site may be helpful when planning construction and/or repair projects at the site.

Accordingly, it would be desirable to provide systems and methods for improved underground line locators.

SUMMARY

A system for underground line location using motion based responsiveness may include an underground line locator. The underground line locator includes a receiver generating raw measurement data based on a location of an underground line relative to the receiver, a motion sensor generating motion data based on a state of motion of the underground line locator, a processor coupled to the receiver and the motion sensor, and a display coupled to the processor. The processor determines a measurement signal based on the raw measurement data. A responsiveness of the measurement signal to the raw measurement data is based on the motion data. The display shows a representation of the measurement signal.

A method for underground line location using motion based responsiveness may include determining a state of motion of an underground line locator, determining a desired responsiveness of a display of the underground line locator based on the state of motion of the underground line locator, and adjusting a responsiveness of the display to achieve the desired responsiveness.

A display interface for an underground line locator with motion based responsiveness may include a graphical indicator displaying at least one measurement signal determined by the underground line locator. A responsiveness of the graphical indicator is determined based on a state of motion of the underground line locator.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
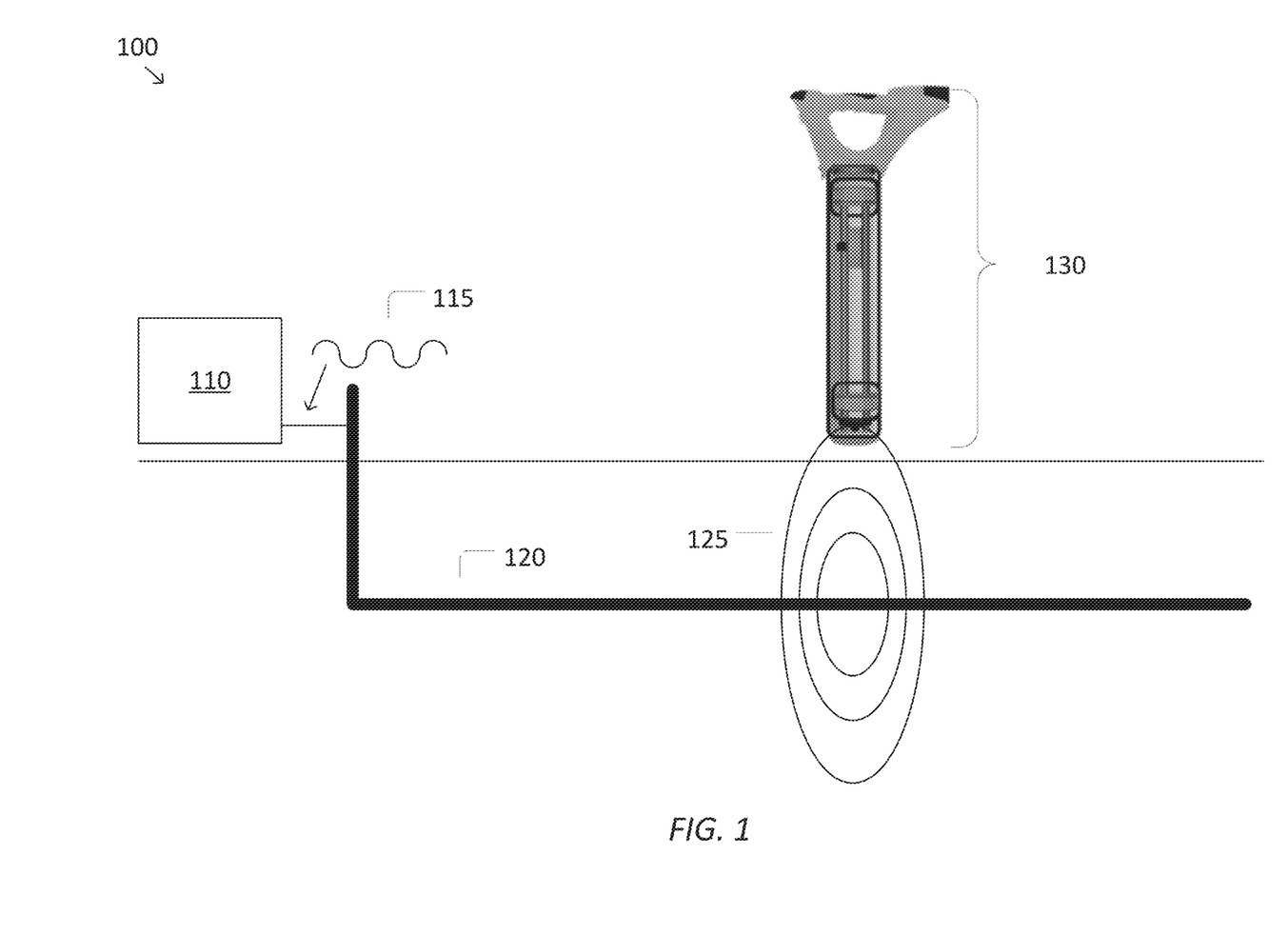
FIG. 1 is a simplified diagram of an underground line locator system according to some embodiments.

FIG. 1 is a simplified diagram of an underground line locator system 100 according to some embodiments. A transmitter 110 couples a locate tone 115 onto one or more underground lines 120. Transmitter 110 may include a signal generator implemented using portable components, components that are fixed to underground line 120, and/or a combination of fixed and portable components. Locate tone 115 may include an alternating current (AC) electrical signal that is generated by transmitter 110 and transmitted through underground line 120. Locate tone 115 may include any suitable time-varying signal, such as an AC waveform at a predetermined frequency, a pulse sequence, a modulated AC waveform carrying information based on its time-varying frequency, amplitude, and/or phase, and/or the like. In some examples, locate tone 115 may be decomposed into in-phase and quadrature components based on a reference phase.

When locate tone 115 is transmitted through underground line 120, a time-varying magnetic field 125 is generated around underground line 120 via electromagnetic induction. A locator 130 is used to detect magnetic field 125 and/or characteristics of magnetic field 125, such as its strength, gradient, and/or direction. Locator 130 may further detect information embedded in a time-varying signal carried by magnetic field 125. Based on the detected characteristics of magnetic field 125, locator 130 determines the location and/or identity of underground line 120.

Locator 130 may be a portable underground line locator operated by a user. In some examples, the user may manually move locator 130 around a survey area and record the location of at least a portion of underground line 120 as determined by locator 130. In some examples, the user may swing locator 130 back and forth while moving around the survey area. In some examples, the user may not swing locator 130 back and forth, but instead may maintain locator 130 at a constant position relative to the user as the user moves around the survey area. In some examples the user may move quickly (e.g., by walking and/or swinging locator 130 back and forth) while scanning large areas of the survey area to search for underground line 120 and/or obtain a rough estimate of its location. Subsequently, the user may move slowly in the vicinity of underground line 120 in order to refine the rough estimate.

Locator 130 may provide feedback to the user by any suitable mechanism, such as audio, visual, and/or haptic feedback. According to some embodiments, locator 130 may provide visual feedback to the user through a display interface that may convey information in various formats including text, numbers, colors, bar graphs, arrows, meters, needles, maps and/or the like. The information conveyed through the display is responsive to changes in the detected characteristics of magnetic field 125. The responsiveness (i.e., the speed at which the display responds to changes in the detected characteristics of magnetic field 125) and the noise immunity (i.e., the stability and accuracy of the measurements displayed) depends upon filtering techniques used by locator 130. A user typically desires both high responsiveness to support rapid detection of utility line location and high noise immunity to stabilize the display reading and provide accurate measurements. However, conventional filtering techniques used by utility line locators generally involve a trade-off between responsiveness and noise immunity. Narrowband filtering techniques increase noise immunity and decrease responsiveness, while wideband filtering techniques increase responsiveness and decrease noise immunity. According to some embodiments, locator 130 may be designed to improve upon conventional utility line locators by providing motion based responsiveness to mitigate the trade-offs between responsiveness and noise immunity.

Figure 2:
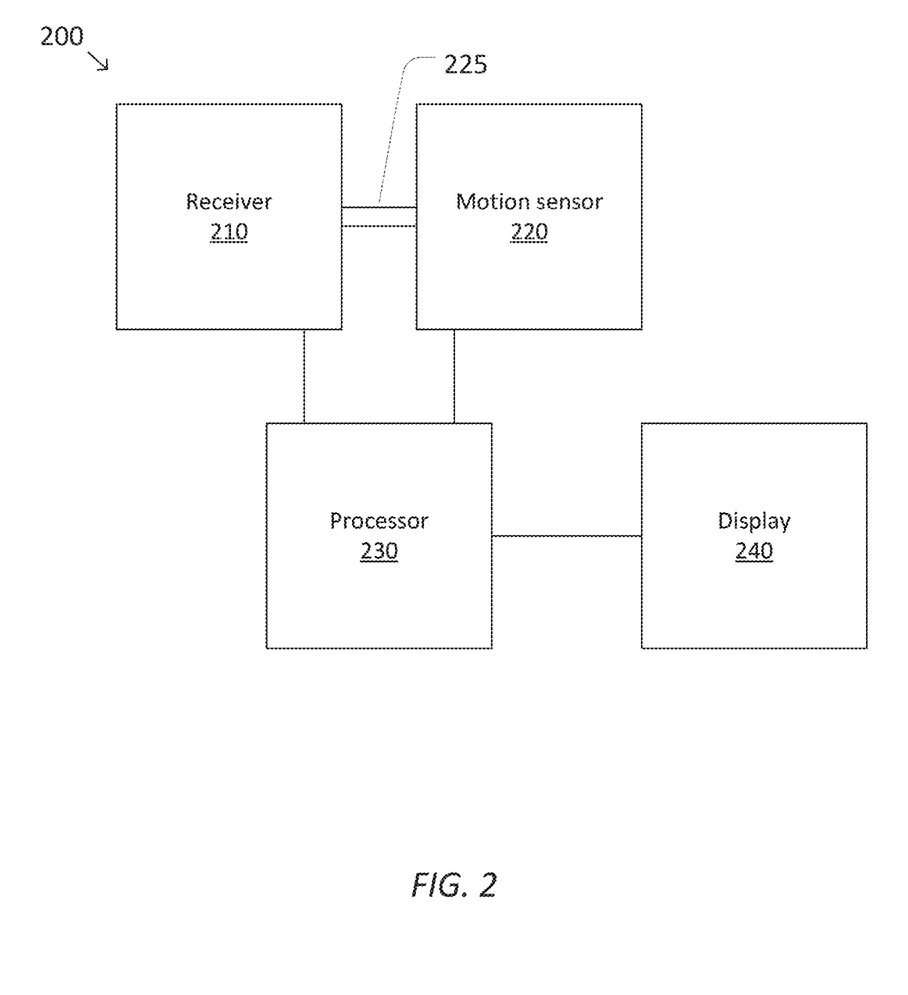
FIG. 2 is a simplified diagram of a locator with motion based responsiveness according to some embodiments.

FIG. 2 is a simplified diagram of a locator 200 with motion based responsiveness according to some embodiments. According to some embodiments consistent with FIG. 1, locator 200 may be used to implement locator 130 and/or portions thereof. Locator 200 includes a receiver 210 that generates raw measurement data based on a location of underground line, such as underground line 120, relative to receiver 210. In some embodiments, the raw measurement data may include an electrical signal that represents the strength of a time-varying magnetic field, such as magnetic field 125, generated by the underground line.

A motion sensor 220 generates motion data based on a state of motion of locator 200. In some examples, the state of motion may include a velocity and/or acceleration of locator 200, which may be represented as continuous variables and/or discrete categories (e.g., "fast," "slow," "accelerating," "decelerating," and/or the like). In some examples, the state of motion may correspond to a state of motion of an operator of locator 200. For example, exemplary states of motion may include "standing still," "in motion," "walking," "swinging back and forth," and/or the like. According to some embodiments, receiver 210 and motion sensor 220 may have a fixed position relative to one another. For example, receiver 210 and motion sensor 220 may be coupled by a rigid member 225, and/or may be disposed within a same enclosure/chassis. In this manner, motion sensor 220 may accurately capture a state of motion of receiver 210 of locator 200 in real-time using a device such as an inertial sensor. In some embodiments, motion sensor 220 may capture the state of motion of locator 200 in other ways, such as a user input (e.g., a manual selection by the operator), an inertial sensor mounted to the operator, an apparatus external to locator 200 (e.g., a camera directed to the survey area to capture the motion of locator 200 and/or its operator), a mobile and/or wearable device of the operator, and/or the like. According to some embodiments, automatic techniques for capturing the state of motion may be preferred to manual techniques, as manual adjustments may be tedious and/or error prone.

A processor 230 is coupled to receiver 210 and motion sensor 220 to receive the raw measurement data and the motion data, respectively. Processor 230 outputs one or more processed measurement signals to a display 240 that is viewable by an operator of locator 200. The one or more processed measurement signals are determined based on the raw measurement data.

According to some embodiments, the one or more processed measurement signals may be characterized by a responsiveness to the raw measurement data, where the responsiveness indicates how closely the processed measurement signal tracks fluctuations in the raw measurement data. Generally, when the raw measurement data is stable, a low responsiveness (i.e., narrowband operation) is desired in order to filter out as much noise as possible from the raw measurement data. When the raw measurement data is in a state of rapid transition, a high responsiveness (i.e., wideband operation) is desired in order to accurately capture the rapid transition (e.g., a pulse, step, oscillation, and/or the like).

According to some embodiments, processor 230 may be adapted to provide an adjustable responsiveness that is based on the state of motion of locator 200. In some embodiments, the adjustable responsiveness may be provided using adaptive filtering techniques. In some embodiments, the responsiveness may be manually and/or automatically adjusted based on the state of motion of locator 200. In furtherance of such embodiments, the responsiveness may be determined based on the motion data from motion sensor 220.

For example, when the motion data indicates that an operator of locator 200 is in motion (e.g., while walking and/or swinging locator 200 back and forth to search a wide area to find an underground line), the raw measurement data generated by receiver 210 is expected to fluctuate rapidly. For example, the operator may pass over an underground line in just a few tenths of a second, causing a brief pulse in the raw measurement data from receiver 210. Accordingly, a high responsiveness prevents the brief pulse from being filtered out and allows the pulse to register on display 240. On the other hand, when the motion data indicates that the operator of locator 200 is still (e.g., after quickly determining the approximate location of the underground line, stopping to more precisely determine its location and/or depth), the raw measurement data is expected to be stable. Accordingly, in such cases a low responsiveness improves the noise immunity of the one or more processed measurement signals.

Display 240 may include any device suitable for displaying the one or more measurement signals generated by processor 230 to an operator of locator 200. In some examples, display 240 may include a graphical user interface that displays one or more bar graphs, peak indicators, left-right indicators, meters, and/or the like. In some examples, display 240 may display alphanumeric text, symbols, and/or the like. In some examples, display 240 may be updated continuously in real-time and/or periodically. In addition to and/or instead of a visual interface, display 240 may include an audio and/or haptic interface such as speakers, vibration elements, and/or the like.

Figure 3:
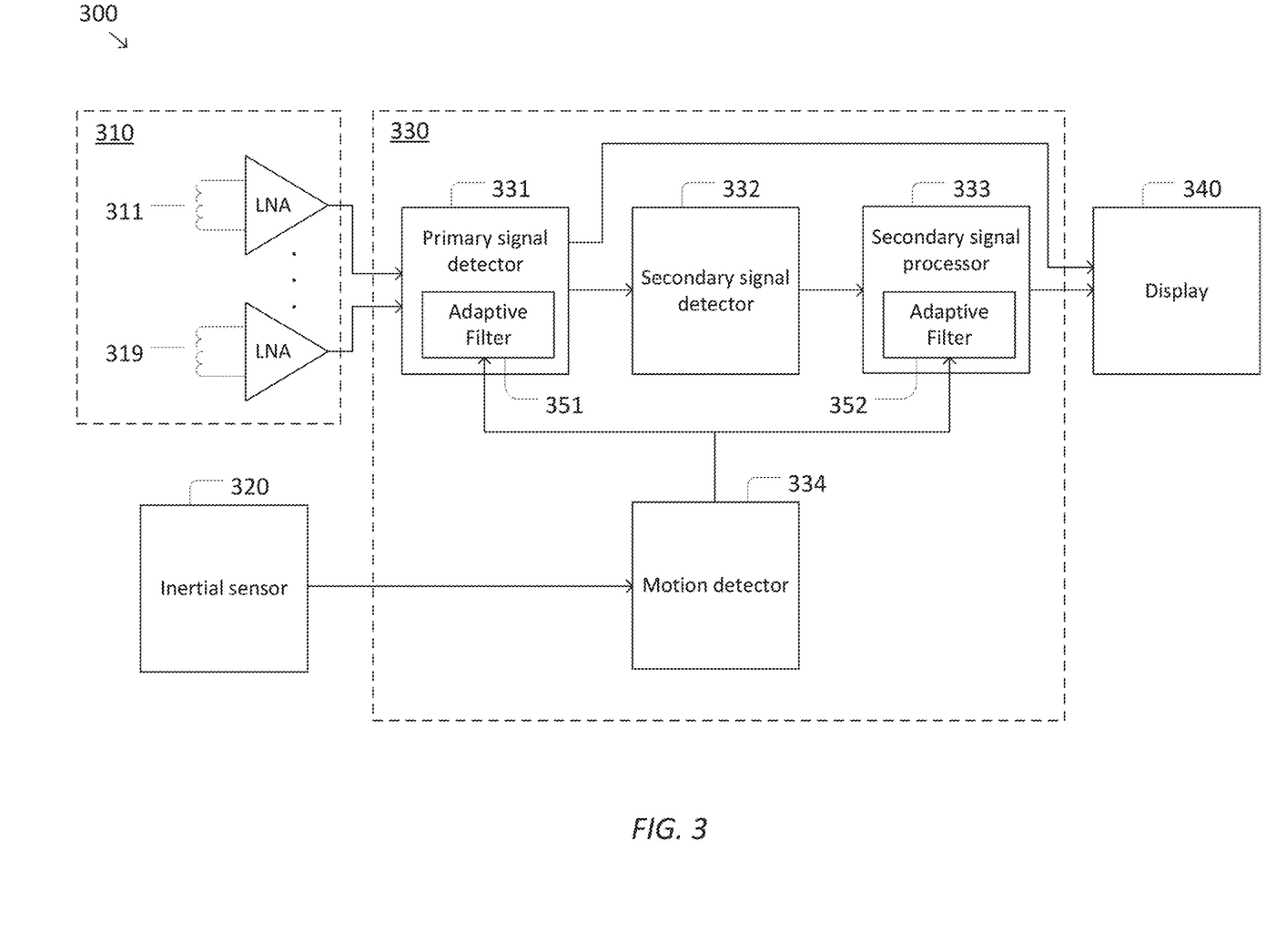
FIG. 3 is a simplified diagram of a locator with motion controlled adaptive filtering according to some embodiments.

FIG. 3 is a simplified diagram of a locator 300 with motion controlled adaptive filtering according to some embodiments. According to some embodiments consistent with FIGS. 1-2, locator 300 may be used to implement locator 130, locator 200, and/or both. Like locator 200, locator 300 includes a receiver 310 that generates raw measurement data based on a location of an underground line, such as underground line 120, relative to receiver 310. In some embodiments, the raw measurement data may include an electrical signal that represents the strength of a time-varying magnetic field, such as magnetic field 125, emitted by the underground line. In furtherance of such embodiments, receiver 310 may include an antenna and/or an array of antennas 311-319 to detect the strength of the time-varying magnetic fields. Such antennas may include inductive coils, hall effect sensors, and/or other suitable devices/technique for converting the measured magnetic field into an electrical signal. As depicted in FIG. 3, each inductive coil in array of antennas 311-319 may be coupled to a low noise amplifier (LNA) to amplify the electrical signals, the output of the LNAs corresponding to the raw measurement data of receiver 310.

An inertial sensor 320 generates motion data based on a state of motion of locator 300. The motion data supports a determination of whether locator 300 is still (e.g., not moving and/or moving slowly) or in motion (e.g., moving quickly and/or swinging back and forth). In order to generate the motion data, inertial sensor 320 may include one or more accelerometers, gyroscopes, microelectromechanical systems (MEMS), and/or the like. In some examples, the motion data generated by inertial sensor 320 may include an analog and/or digital signal representing the position, velocity, and/or acceleration of locator 300.

A processor 330 is coupled to receiver 310 and inertial sensor 320 to receive the raw measurement data and motion data, respectively. Processor 330 receives and processes the raw measurement data from receiver 310 to generate one or more measurement signals. In some examples, processor 330 may apply one or more filters, peak detectors, left-right detectors, and/or the like to the raw measurement data. For example, processor 330 may include primary signal detector 331 to detect a primary measurement signal at a particular frequency and/or range of frequencies from the raw measurement data. In furtherance of such embodiments, primary signal detector 331 may include an adaptive band-pass filter 351. In general, a band-pass filter with a wide bandwidth has a high responsiveness to fluctuations in the raw measurement data, whereas a band-pass filter with a narrow bandwidth has a low responsiveness. Thus, according to some embodiments, adaptive band-pass filter 351 may have an adjustable bandwidth in order to vary the responsiveness of locator 300. According to some embodiments, the adjustable bandwidth may be determined based on the state of motion of locator 300, as will be described in greater detail below.

Processor 330 may further include a secondary signal detector 332 coupled to receive the primary measurement signal from primary signal detector 331 and generate a secondary measurement signal. For example, the secondary measurement signal may include a peak signal, a left-right signal, and/or the like. In some examples, the peak signal may indicate the maximum value of the primary measurement signal over a predetermined range of time. In some examples, the left-right signal may indicate the position of an underground line relative to locator 300. For example, in order to detect a left-right signal, secondary signal detector 332 may compare primary measurement signals corresponding to two or more antennas located at different positions (e.g., antennas 311-319) to estimate the position of an underground line relative to the center of locator 300.

A secondary signal processor 333 may receive and process the secondary measurement signal from secondary signal detector 332. For example, secondary signal processor 333 may receive and process the peak signal and/or left-right signal detected by secondary signal detector 332. In some examples, secondary signal processor 333 may determine the position of an indicator based on the secondary measurement signal. For example, secondary signal processor 333 may determine the position of a peak indicator line on a bar graph (e.g., when the secondary measurement signal includes a peak signal) and/or the position of a needle on a left-right indicator (e.g., when the secondary measurement signal includes a left-right signal). Examples of bar graphs and left-right indicators consistent with such embodiments are discussed in further detail below with reference to FIGS. 4 and 5.

According to some embodiments, secondary signal processor 333 may include an adaptive low-pass filter 352 to filter out high frequency components of the secondary measurement signal that typically correspond to noise. In general, a low-pass filter with a high cutoff frequency has a high responsiveness to fluctuations in the secondary measurement signal, whereas a low-pass filter with a low cutoff frequency has a low responsiveness. Thus, according to some embodiments, adaptive low-pass filter 352 may have an adjustable cutoff frequency in order to vary the responsiveness of locator 300. According to some embodiments, the adjustable cutoff frequency may be determined based on the state of motion of locator 300.

A motion detector 334 receives motion data from inertial sensor 320 and generates one or more control signals to vary the bandwidth of adaptive band-pass filter 351 and/or the cutoff frequency of adaptive low pass filter 252. In this manner, motion detector 334 provides a mechanism to control the responsiveness of locator 300 in response to the state of motion of locator 300. According to some embodiments, motion detector 334 interprets the received motion data to determine whether higher or lower responsiveness is desirable and generates corresponding control signals to achieve the desired responsiveness. For example, when the motion data indicates that the operator of locator 300 is walking and/or otherwise has locator 300 in motion, motion detector 334 may generate control signals to cause the bandwidth of adaptive band-pass filter 351 and/or the cutoff frequency of adaptive low-pass filter 352 to increase (i.e., wideband operation). Conversely, when the motion data indicates that locator 300 is moving slowly and/or otherwise still, motion detector 334 may generate control signals to cause the bandwidth of adaptive band-pass filter 351 and/or the cutoff frequency of adaptive low-pass filter 352 to decrease (i.e., narrowband operation).

A display 340 generally corresponds to display 240 as depicted in FIG. 2. Display 340 receives one or more measurement signals (e.g. the primary measurement signal from primary signal detector 331 and/or the filtered secondary measurement signal from secondary signal processor 333) from processor 330 and conveys the measurement signals to the operator of locator 300 through a display interface. In some embodiments, display 340 may include a screen for displaying one or more graphical indicators on a graphical user interface. The type of graphical indicator may depend on the type of primary and/or secondary measurement signal. For example, a peak signal may be displayed using a bar graph, and a left-right signal may be displayed using a left-right indicator.

Figure 4A:
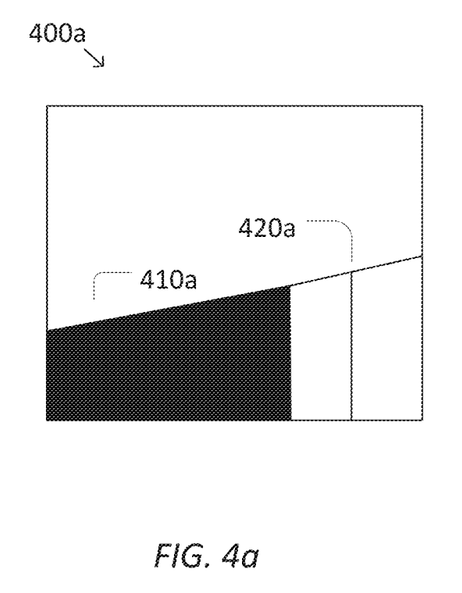
FIGS. 4a, 4b, and 4c are simplified diagrams of bar graph indicators for displaying a primary and secondary measurement signal according to some embodiments.
Figure 4B:
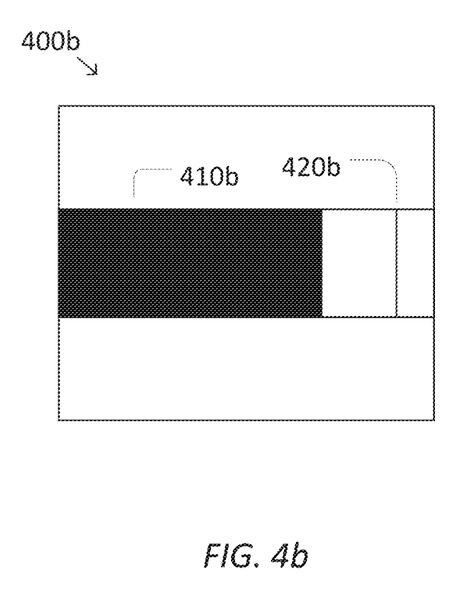
Figure 4C:
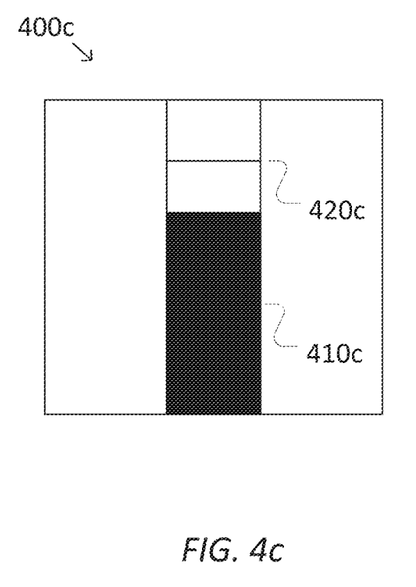

FIGS. 4a-c are simplified diagrams of bar graph indicators 400 a-c for displaying a primary and secondary measurement signal according to some embodiments. According to some embodiments, bar graph indicators 400 a-c may include bars 410 a-c for displaying a primary measurement signal and lines 420 a-c for displaying a secondary measurement signal. As depicted in FIGS. 4 a-c, bar graph indicators 400 a-c may have a horizontal (FIGS. 4 a and b) and/or vertical (FIG. 4c) orientation. In furtherance of such embodiments, the level of bars 410 a and b and/or the position of lines 420 a and b may vary in the horizontal direction to indicate the strength of the primary and/or secondary signal, respectively. Similarly, the level of bar 410c and/or the position of line 420c may vary in the vertical direction to indicate the strength of the primary and/or secondary signal, respectively.

Bar graph indicators 400 a-c may be particularly well-suited for applications where the secondary measurement signal represents a peak signal strength (e.g., when secondary signal detector 332 and secondary signal processor 333 are configured as a peak detector and peak signal processor, respectively). According to some embodiments, the responsiveness of the primary measurement signal indicated by bars 410a-c and/or the secondary measurement signal indicated by lines 420a-c may be determined based on a state of motion of a locator, such as locator 130, 200, and/or 300. For example, bar graph indicators 400 a-c may enter a high responsiveness mode when the locator is in motion and may enter a high noise rejection mode when the locator is stationary and/or moving slowly. In the high responsiveness mode, the level of bars 410 a-c and/or the positions of lines 420a-c may fluctuate rapidly to closely track the underlying raw measurement data from which the primary and secondary measurement signals are derived. In the high noise rejection mode, the level of bars 410 a-c and/or the positions of lines 420 a-c may fluctuate slowly relative to the underlying raw measurement data in order to filter out noise from the raw measurement data.

Figure 5:
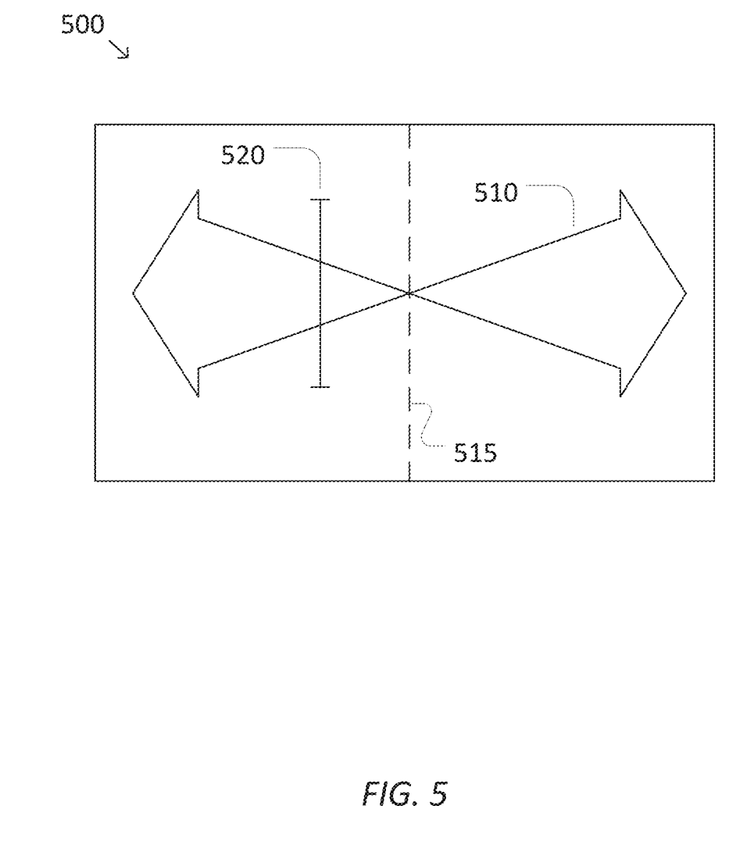
FIG. 5 is a simplified diagram of a left-right indicator for displaying a left-right signal according to some embodiments.

FIG. 5 is a simplified diagram of a left-right indicator 500 for displaying a left-right signal according to some embodiments. According to some embodiments consistent with FIGS. 1-3, the left-right signal may indicate a position of an underground line, such as underground line 120, relative a locator, such as locator 130, 200, and/or 300. As depicted in FIG. 5, left-right indicator 500 may include left-right arrows 510 and a center line 515. A left-right needle 520 indicates the current value of the left-right signal and has a variable horizontal position. When left-right needle 520 is positioned to the left of center line 515, it indicates that the detected underground line is positioned to the left of the locator. When left-right needle is positioned to the right of center line 515, it indicates that the detected underground line is positioned to the right of the locator.

According to some embodiments, the responsiveness of the left-right indicator 500 may be determined based on a state of motion of the locator. For example, left-right indicator 500 may enter a high responsiveness mode when the locator is moving quickly and may enter a high noise rejection mode when the locator is stationary and/or moving slowly. In the high responsiveness mode, the position of left-right needle 520 may fluctuate rapidly to closely track the underlying raw measurement data from which the left-right signal derived. In the high noise rejection mode, the position of left-right needle 520 may fluctuate slowly relative to the underlying raw measurement data in order to filter out noise from the raw measurement data.

Figure 6:
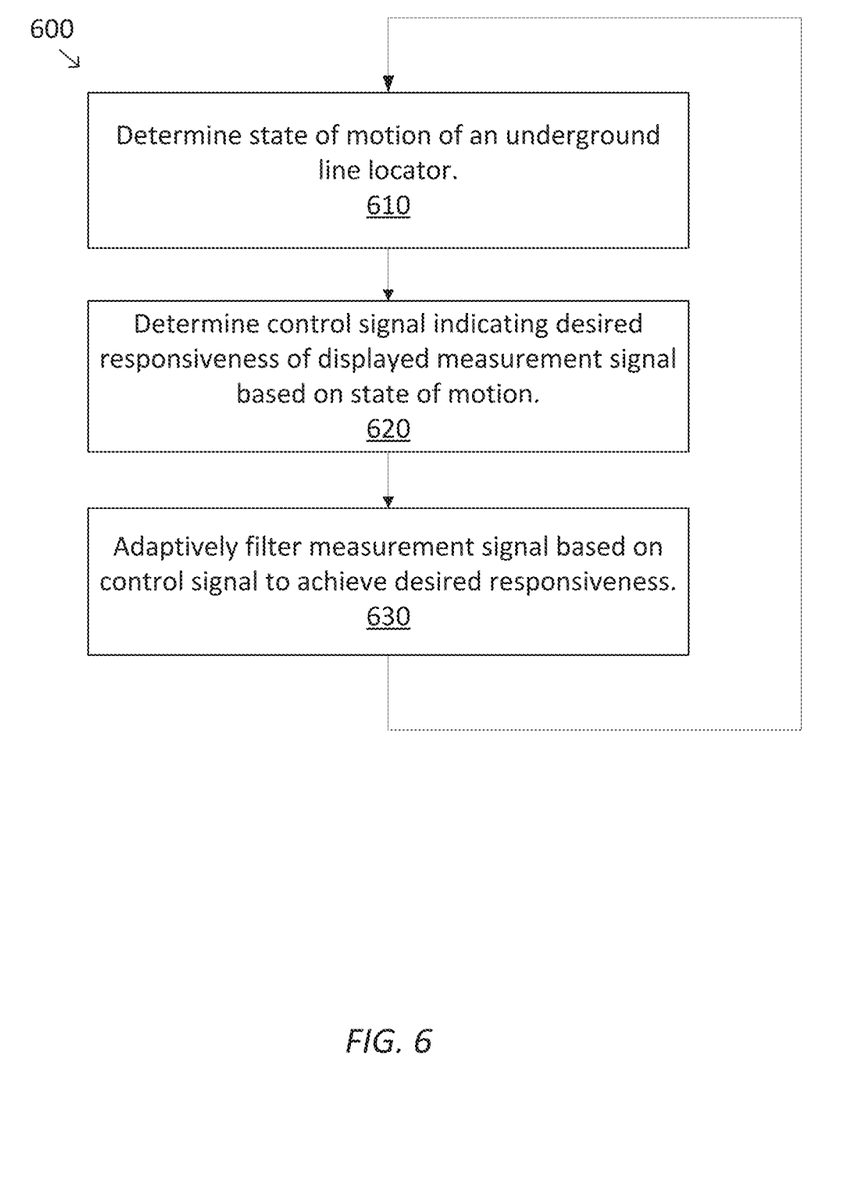
FIG. 6 is a simplified diagram of a method of underground line location using motion based responsiveness according to some embodiments.

FIG. 6 is a simplified diagram of a method 600 of underground line location using motion based responsiveness according to some embodiments. According to some embodiments, method 600 may be performed by an underground line locator, such as locator 130, 200, and/or 300. Method 600 may be used to assist a user in locating one or more underground lines in a survey area.

At a process 610, a state of motion of the underground line locator is determined. The state of motion may be determined using any suitable motion sensor, such as motion sensor 220 and/or inertial sensor 320. According to some embodiments, the motion sensor may be mounted to the underground line locator. In some examples, the motion sensor may be mounted to an operator of the underground line locator and/or any other device/person that moves with the underground line locator. In some examples, an external apparatus, such as a camera system, may be used to track the motion of the underground line locator. In some examples, a manual input may be used to determine the state of motion of the underground line locator, although such manual inputs may be tedious and/or error prone relative to automated techniques.

At a process 620, a control signal indicating the desired responsiveness of a measurement signal displayed by the locator is determined based on the state of motion of the user. In some examples consistent with FIGS. 1-5, the locator may display a measurement signal using a bar graph indicator, such as bar graph indicators 400a-c, and/or a left-right indicator, such as left-right indicator 500. For example, the measurement signal may include a peak signal displayed using a bar graph indicator and/or a left-right signal displayed using a left-right indicator. According to some examples, when the user is moving quickly, the desired responsiveness is fast because the passage of the underground line locator over an underground line is expected to be detected as a brief pulse in the measurement signal. On the other hand, when the user is moving slowly, the desired noise rejection is typically high and the responsiveness is generally less important. In some examples, the desired responsiveness may be represented using a continuous variable (e.g., bandwidth in units of Hertz) and/or a discrete classifier (e.g., "high," "medium," "low," and/or the like). In some examples, the desired responsiveness may be determined by performing a computation based on a continuous variable representing the state of motion (e.g., position, speed, and/or acceleration). In some examples, the desired responsiveness may be determined by performing a look-up based on a discrete classifier representing the state of motion (e.g., "standing still," "walking," "swinging," and/or the like). In furtherance of such embodiments, an intermediate process of classifying the state of motion based on the raw and/or continuous motion data may precede the look-up step. In some examples, the control signal may include any analog and/or digital signal (e.g., an electrical and/or wireless signal) that is usable for determining the desired responsiveness of the measurement signal.

At a process 630, the measurement signal is adaptively filtered based on the control signal to achieve the desired responsiveness. In some examples, adaptively filtering the measurement signal may include adjusting the bandwidth and/or cutoff frequencies of one or more adaptive filters in response to the control signal. According to some embodiments, the bandwidth and/or cutoff frequency is increased to achieve fast responsiveness and the bandwidth is decreased to achieve low responsiveness/high noise reduction. After process 630, method 600 may be repeated as the operator moves throughout the survey area, thereby adjusting the responsiveness of the locator display based on the varying state of motion of the locator.

Figure 7:
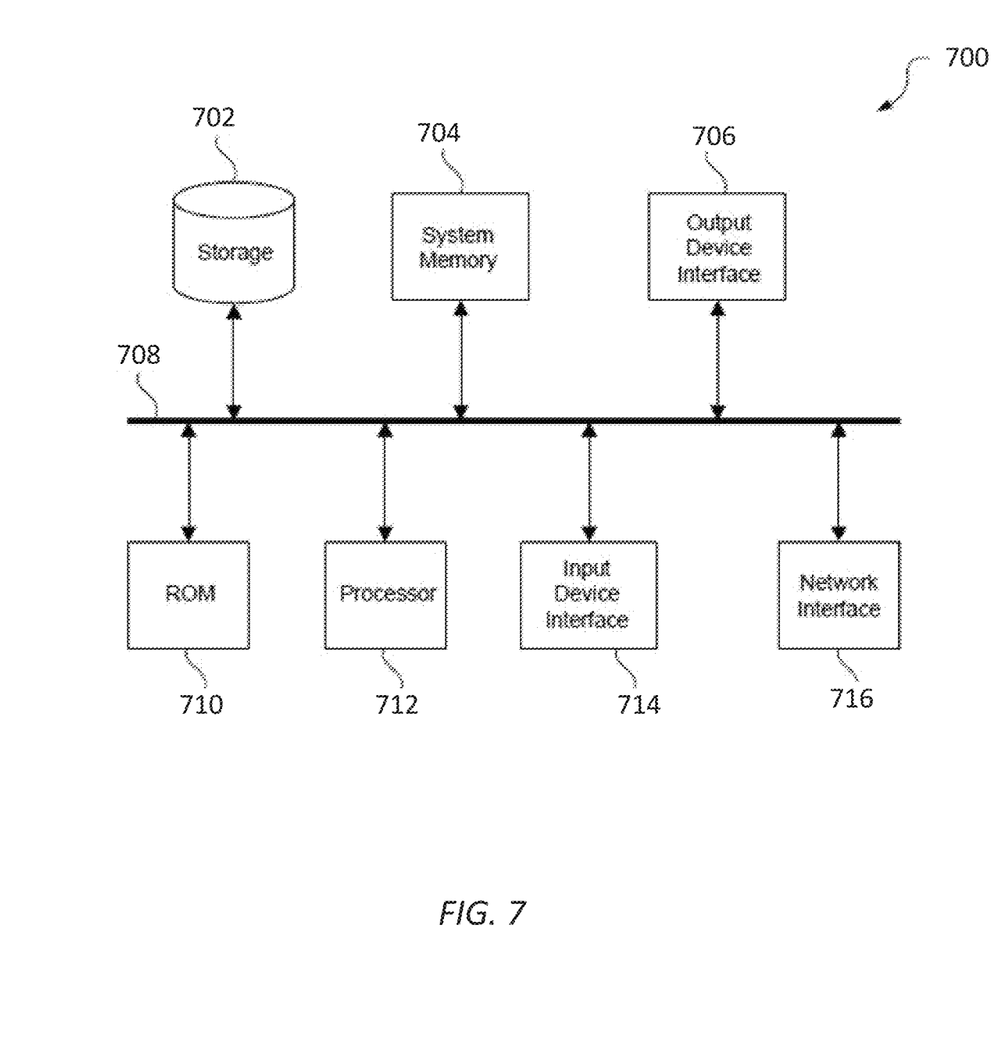
FIG. 7 is a simplified diagram of a computer system in which embodiments of the present disclosure may be implemented.

FIG. 7 is a simplified diagram of a computer system 700 in which embodiments of the present disclosure may be implemented. Computer system 700 may be adapted for performing underground line location with motion based responsiveness. For example, the steps of the operations of method 600 of FIG. 6 may be implemented using system 700. System 700 can be a computer, phone, personal digital assistant (PDA), or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for performing underground line detection and display using motion based responsiveness in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to system 700. Input devices used with input device interface 814 include, for example, alphanumeric, QWERTY, or T9 keyboards, microphones, and pointing devices (also called "cursor control devices"). Output device interfaces 706 enables, for example, the display of images generated by system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network (LAN), such as an Intranet, a wireless network, and/or a wide area network (WAN), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of the operations of method 600 of FIG. 6, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wireless network, and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

Thus, an underground line locator using motion based responsiveness has been described. Embodiments of an underground line locator using motion based responsiveness may include an underground line locator. The underground line locator includes a receiver generating raw measurement data based on a location of an underground line relative to the receiver, a motion sensor generating motion data based on a state of motion of the underground line locator, a processor coupled to the receiver and the motion sensor, and a display coupled to the processor. The processor determines a measurement signal based on the raw measurement data. A responsiveness of the measurement signal to the raw measurement data is based on the motion data. The display shows a representation of the measurement signal. Likewise, an underground line locator system has been described and may generally include a display interface. The display interface may include a graphical indicator displaying at least one measurement signal determined by the underground line locator. A responsiveness of the at least one measurement signal is determined based on a state of motion of the underground line locator.

For any of the foregoing embodiments the system may include any one of the following elements, alone or in combination with each other: the raw measurement data represents a strength of a time-varying magnetic field that is usable to locate the underground line relative to the receiver; the receiver includes one or more antennas for detecting the strength of the time-varying magnetic field; each antenna is coupled to a low noise amplifier for amplifying the detected strength of the time-varying magnetic field; the motion sensor includes an inertial sensor; the motion sensor includes an accelerometer; the motion sensor includes a gyroscope; the measurement signal is determined using a primary signal detector that adaptively filters the raw measurement data using an adaptive band-pass filter; a bandwidth of the adaptive band-pass filter is determined based on the motion data; the measurement signal includes a peak signal, the peak signal representing a maximum value of a primary measurement signal over a predetermined time frame; the peak signal is filtered using an adaptive low-pass filter; a cutoff frequency of the adaptive low-pass filter is determined based on the motion data; the measurement signal includes a left-right signal, the left-right signal indicating whether the underground line is located to a left or to a right of the underground line locator; the left-right signal is filtered using an adaptive low-pass filter; a cutoff frequency of the adaptive low-pass filter is determined based on the motion data; the display interface has a high responsiveness mode and a high noise rejection mode; the display interface operates in the high responsiveness mode when the underground line locator is in motion; and the display interface operates in the high noise rejection mode when the underground line locator is still.

A method for providing feedback to a user of an underground line locator has been described. Embodiments of the method may include determining a state of motion of an underground line locator, determining a control signal indicating a desired responsiveness of a measurement signal displayed by the underground line locator based on the state of motion of the underground line locator, and adaptively filtering the measurement signal based on the control signal to achieve the desired responsiveness.

For the foregoing embodiments, the method may include any one of the following steps, alone or in combination with each other: determining the state of motion of the underground line locator includes determining whether an operator of the underground line locator is still or in motion; determining the control signal includes determining that a higher responsiveness is desired when the operator is in motion than when the operator is still; and adaptively filtering the measurement signal includes increasing a bandwidth of an adaptive filter when a higher responsiveness is desired and decreasing the bandwidth when a lower responsiveness is desired.

What is claimed is:

1. An underground line locator comprising:
   a receiver configured to receive signals from an underground line and to provide raw measurement data from the received signals, the raw measurement data indicative of a location of an underground line relative to the receiver;
   a motion sensor mechanically coupled to the receiver and configured to generate motion data of the underground line locator;
   a processor coupled to the receiver to receive the raw measurement data and coupled to the motion sensor to receive motion data, the processor configured to:
   determine a state of motion from the motion data of the underground line locator,
   set a responsiveness from the state of motion,
   determine a primary measurement signal from the raw measurement data, including filtering with a band-pass filter with an adjustable bandwidth adjusted according to the responsiveness, and
   determine a secondary measurement signal from the primary measurement signal, including filtering with an adaptive low-pass filter that is adjusted in accordance with the responsiveness, the responsiveness determining how quickly display signals track fluctuations in the raw measurement data;
   provide a display signal indicating a measurement signal, which includes the primary measurement signal and the secondary measurement signal; and
   a display coupled to the processor, the display showing the display signal.

2. The underground line locator of claim 1, wherein the raw measurement data represents a strength of a time-varying magnetic field that is emitted by the underground line.

3. The underground line locator of claim 2, wherein the receiver includes one or more antennas for detecting the strength of the time-varying magnetic field.

4. The underground line locator of claim 3, wherein each antenna is coupled to a low-noise amplifier operable for amplifying a detected strength of the time-varying magnetic field, the raw measurement data being provided by the low-noise amplifier.

5. The underground line locator of claim 1, wherein the motion sensor includes an inertial sensor.

6. The underground line locator of claim 1, wherein the motion sensor includes an accelerometer.

7. The underground line locator of claim 1, wherein the motion sensor includes a gyroscope.

8. The underground line locator of claim 1, wherein the measurement signal includes a peak signal, the peak signal representing a maximum value of a primary measurement signal over a predetermined time frame.

9. The underground line locator of claim 1, wherein the display signal includes a left-right signal, the left-right signal indicating whether the underground line is located to a left or to a right of the underground line locator.

10. The underground line locator of claim 9, wherein the left-right signal is filtered using the adaptive low-pass filter, and wherein a cutoff frequency of the adaptive low-pass filter is determined based on the motion data.

11. A method of operating a line locator comprising:
    determining raw measurement data from a receiver of the line locator, the raw measurement data related to signals received from an underground line, the raw measurement data related to signals received from the underground line relative to the line locator;
    determining motion data from a motion detector attached to the line locator;
    determining a state of motion of the underground line locator based on the motion data;
    determining a control signal indicating a responsiveness from the state of motion of the underground line locator;
    determining a primary measurement signal from the raw measurement data, including filtering with a band-pass filter with an adjustable bandwidth adjusted according to the control signal;
    determining a secondary measurement signal from the primary measurement signal by adaptively filtering the primary measurement signal with an adaptive low-pass filter that is adjusted in accordance with the control signal to achieve the responsiveness, the responsiveness indicating how quickly a display data responds to fluctuations in the raw measurement data;
    determining the display data indicating a measurement data, which includes the primary measurement signal and the secondary measurement signal; and
    displaying the display data on a display of the line locator.

12. The method of claim 11, wherein the state of motion of the underground line locator indicates whether the underground line locator is still or in motion.

13. The method of claim 12, wherein the responsiveness of the measurement data includes setting a higher responsiveness when the underground line locator is in motion than when the underground line locator is still.

* * * * *